United States Patent
Wang et al.

(10) Patent No.: US 9,568,763 B2
(45) Date of Patent: Feb. 14, 2017

(54) PHOTOSENSITIVE RESIN COMPOSITION AND USES THEREOF

(71) Applicant: CHI MEI CORPORATION, Tainan (TW)

(72) Inventors: Duan-Chih Wang, Tainan (TW); Jung-Pin Hsu, Tainan (TW)

(73) Assignee: CHI MEI CORPORATION, Tainan (TW)

( * ) Notice: Subject to any disclaimer, the term of this patent is extended or adjusted under 35 U.S.C. 154(b) by 318 days.

(21) Appl. No.: 14/445,764

(22) Filed: Jul. 29, 2014

(65) Prior Publication Data

US 2015/0041735 A1 Feb. 12, 2015

(30) Foreign Application Priority Data

Aug. 9, 2013 (TW) .............................. 102128564 A

(51) Int. Cl.
| | | |
|---|---|---|
| *G02B 5/23* | (2006.01) | |
| *G02F 1/1335* | (2006.01) | |
| *G02B 5/20* | (2006.01) | |
| *G03F 1/00* | (2012.01) | |
| *C09B 67/50* | (2006.01) | |
| *G02B 1/04* | (2006.01) | |

(52) U.S. Cl.
CPC ......... *G02F 1/133514* (2013.01); *G02B 5/201* (2013.01); *G02B 1/04* (2013.01); *G02F 1/133516* (2013.01)

(58) Field of Classification Search
USPC ...... 252/582, 586; 349/106; 359/885; 430/7, 430/270.1, 281.1, 321
See application file for complete search history.

(56) References Cited

U.S. PATENT DOCUMENTS

2008/0220372 A1* 9/2008 Lee .................. G03F 7/0007
430/281.1
2012/0189961 A1* 7/2012 Ji .................... G03F 7/027
430/281.1

FOREIGN PATENT DOCUMENTS

| GB | WO 2012017233 A1 * | 2/2012 | ........... C09D 139/02 |
|---|---|---|---|
| JP | 1995-234313 | 9/1995 | |
| TW | 201241561 A1 | 10/2012 | |
| WO | 2012/017233 A1 | 2/2012 | |

OTHER PUBLICATIONS

Office action and Search report issued on Oct. 22, 2014 for the corresponding Taiwan Patent Application No. 102128564.
Translation of the Search report issued on Oct. 21, 2014 for the corresponding Taiwan Patent Application No. 102128564.
Translation of TW 201241561 A1.
WO 2012/017233 A1 corresponds to US 2014370279 A1.

* cited by examiner

*Primary Examiner* — Bijan Ahvazi
(74) *Attorney, Agent, or Firm* — WPAT, P.C. Intellectual Property Attorneys; Anthony King

(57) ABSTRACT

The invention relates to a photosensitive resin composition that has the advantages of high developability, good hardness, and good sputtered resistance. The invention also provides a method for manufacturing a color filter, color filter and a liquid crystal display device. The photosensitive resin composition comprises an alkali-soluble resin (A), a compound containing an ethylenically unsaturated group (B), a photoinitiator (C), an organic solvent (D), a pigment (E), and a compound (F).

19 Claims, No Drawings

PHOTOSENSITIVE RESIN COMPOSITION AND USES THEREOF

BACKGROUND OF THE INVENTION

1. Field of the Invention

The invention relates to a photosensitive resin composition for a color filter in a liquid crystal display device, and a color filter and liquid crystal display device formed by the aforementioned photosensitive resin composition. More particularly, the invention also provides a photosensitive resin composition for a color filter having high developability, good hardness, and good sputtered resistance and a color filter and liquid crystal display device formed by the aforementioned photosensitive resin composition.

2. Description of the Related Art

With a color filter has been applied widely in a color liquid crystal display device, color fax machine, color camera and other office equipments, the production technology of the color filter also tends to diversify, for example, a dyeing method, a printing method, a plating method, and a dispersion method, and wherein the dispersion method is a mainstream. The dispersion method, first, uses chrome/chromium or a photosensitive resin to form a black matrix for shading on a glass substrate, and coats a photosensitive resin (also referred as color photoresist) dispersed with a red pigment on the glass substrate. After the steps of exposure and development, a red pixel can be obtained. Such process is repeated, and a green and blue pixel can be obtained thereby. The red, green and blue pixels are separated by the black matrix, and a pixel color layer is formed on the glass substrate. A protective film is applied onto the pixel color layer as needed. Then, a transparent conductive film is formed on the protective film. After cutting, the color filter is prepared.

In the process of forming the color filter, the pixel color layer out of a needed pattern is removed after development. Even though in a process of brushing, it also needs to make sure the needed pattern not to be damaged or lacked. Japanese Patent Publication No. 1995-234313 discloses using a specific filler to improve the hardness of the pixel color layer.

In order to simplify the process and pursue high transmittance, the protective film is often omitted. However, because omitting the protective film, the pixel color layer of Japanese Patent Publication No. 1995-234313 can not bear strong electron beam and cleavages in a process of sputtering to form the transparent conductive film.

Therefore, a photosensitive resin composition that enhancing the developability, hardness and sputtered resistance at the same time is a target remained to be achieved.

SUMMARY OF THE INVENTION

In the present invention, a specific compound containing an ethylenically unsaturated group and a compound containing a specific structure are provided to obtain a photosensitive resin composition having high developability, good hardness, and good sputtered resistance.

Therefore, the invention relates to a photosensitive resin composition for a color filter comprising:
an alkali-soluble resin (A);
a compound containing an ethylenically unsaturated group (B);
a photoinitiator (C);
an organic solvent (D);
a pigment (E); and
a compound (F) represented by Formula (I);

Formula (I)

wherein:
$R^1$ is selected from the group consisting of hydrogen, halogen, a nitro group, a hydrocarbyl group and

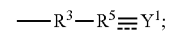

$R^2$ and $R^3$ are independently selected from the group consisting of $(CR^7R^8)_n$, $CR^9R^{10}$, $CR^7R^8CR^9R^{10}$ and $CR^9R^{10}CR^7R^8$;
n is 0, 1 or 2;
$R^7$ and $R^8$ are independently selected from the group consisting of hydrogen, halogen and a hydrocarbyl group;
either one of $R^9$ or $R^{10}$ is hydrogen and the other is an electron withdrawing group, or $R^9$ and $R^{10}$ together form an electron withdrawing group;
$R^4$ and $R^5$ are independently selected from the group consisting CH and $CR^{11}$;
$R^{11}$ is an electron withdrawing group;
the dotted line indicates the presence or absence of a bond;
$X^1$ is a $CX^2X^3$ group where the dotted line bond to which it is attached is absent; $X^1$ is a $CX^2$ group where the dotted line bond to which it is attached is present;
$Y^1$ is a $CY^2Y^3$ group where the dotted line bond to which it is attached is absent; $Y^1$ is a $CY^2$ group where the dotted line bond to which it is attached is present;
$X^2$, $X^3$, $Y^2$ and $Y^3$ are independently selected from the group consisting hydrogen, fluorine, a hydrocarbyl group, an alkyl group, an aryl group and a heterocyclic group; and
$R^{13}$ is C(O) or S(O)$_2$.

The present invention also provides a method for manufacturing a color filter, which forms a pixel layer by the photosensitive resin composition as mentioned above.

The present invention also provides a color filter, which is manufactured by the method as mentioned above.

The present invention further provides a liquid crystal display device comprising the color filter as mentioned above.

DETAILED DESCRIPTION OF THE INVENTION

The invention relates to a photosensitive resin composition for a color filter comprising:
an alkali-soluble resin (A);
a compound containing an ethylenically unsaturated group (B);
a photoinitiator (C);

an organic solvent (D);
a pigment (E); and
a compound (F) represented by Formula (I);

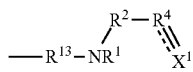

Formula (I)

wherein:
R$^1$ is selected from the group consisting of hydrogen, halogen, a nitro group, a hydrocarbyl group and;
R$^2$ and R$^3$ are independently selected from the group consisting of (CR$^7$R$^8$)$_n$, CR$^9$R$^{10}$, CR$^7$R$^8$CR$^9$R$^{10}$ and CR$^9$R$^{10}$CR$^7$R$^8$;
n is 0, 1 or 2;
R$^7$ and R$^8$ are independently selected from the group consisting of hydrogen, halogen and a hydrocarbyl group;
either one of R$^9$ or R$^{10}$ is hydrogen and the other is an electron withdrawing group, or R$^9$ and R$^{10}$ together form an electron withdrawing group;
R$^4$ and R$^5$ are independently selected from the group consisting CH and CR$^{11}$;
R$^{11}$ is an electron withdrawing group;
the dotted line indicates the presence or absence of a bond;
X$^1$ is a CX$^2$X$^3$ group where the dotted line bond to which it is attached is absent; X$^1$ is a CX$^2$ group where the dotted line bond to which it is attached is present;
Y$^1$ is a CY$^2$Y$^3$ group where the dotted line bond to which it is attached is absent; Y$^1$ is a CY$^2$ group where the dotted line bond to which it is attached is present;
X$^2$, X$^3$, Y$^2$ and Y$^3$ are independently selected from the group consisting hydrogen, fluorine, a hydrocarbyl group, an alkyl group, an aryl group and a heterocyclic group; and
R$^{13}$ is C(O) or S(O)$_2$.

The alkali-soluble resin (A) according to the present invention comprises a compound polymerized by a mixture which contains a first unsaturated monomer (a-1) containing a carboxylic acid group, and a second unsaturated monomer (a-2).

The aforementioned first unsaturated monomer (a-1) is selected from the group containing of acrylic acid, methacrylic acid, 2-methyl-acryloyl ethoxy acid esters, crotonic acid, α-chloro acrylic acid, ethyl acrylic acid, cinnamic acid, maleic acid, maleic acid anhydrate, fumaric acid, itaconic acid, itaconic acid anhydrate, citraconic acid, citraconic acid anhydrate and a combination thereof. Preferably, the first unsaturated monomer (a-1) is selected from the group containing of acrylic acid, methacrylic acid, 2-methyl-acryloyl ethoxy acid esters and a combination thereof.

In one embodiment of the present invention, based on 100 parts by weight of the total used amount of the mixture, the used amount of the first unsaturated monomer (a-1) is 5 parts by weight to 50 parts by weight, preferably 8 parts by weight to 45 parts by weight, and more preferably 10 parts by weight to 40 parts by weight.

The second unsaturated monomer (a-2) can be dicyclopentyl acrylate, dicyclopentyl ethoxy acrylate, dicyclopentenyl acrylate, dicyclopentenyl ethoxy acrylate, dicyclopentyl methacrylate, dicyclopentyl ethoxy methacrylate, dicyclopentenyl methacrylate, dicyclopentenyl ethoxy methacrylate, styrene, α-methyl styrene, vinyl toluene, chloro styrene, divinyl benzene, benzyl methacrylate, benzyl acrylate, phenyl methacrylate, phenyl acrylate, 2-nitrophenyl acrylate, 4-nitrophenyl acrylate, 2-nitrobenzyl acrylate, 2-nitrobenzyl methacrylate, 2-nitrophenyl methacrylate, 2-chlorophenyl methacrylate, 4-chlorophenyl methacrylate, 2-chlorophenyl acrylate, 4-chlorophenyl acrylate, phenoxyethyl methacrylate, phenoxy polyethylene glycol acrylate, phenoxy polyethylene glycol methacrylate, nonyl phenoxy polyethylene glycol acrylate, nonyl phenoxy polyethylene glycol methacrylate, N-phenyl maleimide, N-o-hydroxyphenyl maleimide, N-m-hydroxyphenyl maleimide, N-p-hydroxyphenyl maleimide, N-o-methoxyl phenyl maleimide, N-m-methyl phenyl maleimide, N-p-methyl phenyl maleimide, N-o-methoxyl phenyl maleimide, N-m-methoxyl phenyl maleimide, N-p-methoxyl phenyl maleimide, o-vinyl phenol, m-vinyl phenol, p-vinyl phenol, 2-methyl-4-vinyl phenol, 3-methyl-4-vinyl phenol, o-isopropenyl phenol, m-isopropenyl phenol, p-isopropenyl phenol, 2-vinyl-1-naphthol, 3-vinyl-1-naphthol, 1-vinyl-2-naphthol, 3-vinyl-2-naphthol, 2-isopropenyl-1-naphthol, 3-isopropenyl-1-naphthol, o-methoxy styrene, m-methoxy styrene, p-methoxy styrene, o-methoxy methyl styrene, m-methoxy methyl styrene, p-methoxy methyl styrene, o-(vinyl benzyl)epoxypropyl ether, m-(vinyl benzyl)epoxypropyl ether, p-(vinyl benzyl) epoxypropyl ether, indene, acetyl naphthalene, N-cyclohexyl maleimide, methyl acrylate, ethyl acrylate, n-propyl acrylate, isopropyl acrylate, n-butyl acrylate, isobutyl acrylate, sec-butyl acrylate, tert-butyl acrylate, 2-hydroxyethyl acrylate, 2-hydroxypropyl acrylate, 3-hydroxypropyl acylate, 2-hydroxybutyl acrylate, 3-hydroxybutyl acrylate, 4-hydroxybutyl acrylate, allyl acrylate, triethylene glycol dimethoxy acrylate, N,N-dimethyl amino ethyl acrylate, N,N-diethyl amino propyl acrylate, N,N-dibutyl amino propyl acrylate, epoxypropylacrylate, methyl methacrylate, ethyl methacrylate, n-propyl methacrylate, isopropyl methacrylate, n-butyl methacrylate, isobutyl methacrylate, sec-butyl methacrylate, tert-butyl methacrylate, 2-hydroxyethyl methacrylate, 2-hydroxypropyl methacrylate, 3-hydroxypropyl methacrylate, 2-hydroxybutyl methacrylate, 3-hydroxybutyl methacrylate, 4-hydroxybutyl methacrylate, allyl methacrylate, triethylene glycol methoxyl dimethacrylate, dodecy 2-methacrylate, myristyl methacrylate, cetyl methacrylate, octadecyl methacrylate, eicosyl methacrylate, behenyl methacrylate, N,N-dimethyl amino ethyl methacrylate, N,N-dimethyl amino propyl methacrylate, N-isobutyl amino ethyl methacrylate, epoxy propyl methacrylate, vinyl acetate, vinyl propionate, vinyl butyrate, methoxyethene, ethoxyethene, allyl glycidyl ether, methallyl glycidyl ether, acrylonitrile, methacrylonitrile, α-chloro acrylonitrile, vinylidene cyanide, acrylamide, methacrylamide, α-chloro acrylamide, N-hydroxyethyl acrylamide, N-hydroxyethyl methacrylamide, 1,3-butadiene, isoamylene, chloroprene and a combination thereof. Preferably, the second unsaturated monomer (a-2) is dicyclopentyl acrylate, dicyclopentyl ethoxy acrylate, dicyclopentenyl acrylate, dicyclopentenyl ethoxy acrylate, dicyclopentyl methacrylate, dicyclopentyl ethoxy methacrylate, dicyclopentenyl methacrylate, dicyclopentenyl ethoxy methacrylate, styrene, α-methyl styrene, phenyl methacrylate, phenyl acrylate, N-phenyl maleimide, N-o-hydroxy phenyl maleimide, N-m-hydroxy phenyl maleimide, N-p-hydroxy phenyl maleimide, methyl acrylate, ethyl acrylate, n-propyl acrylate, isopropyl acrylate, n-butyl acrylate, isobutyl acrylate, sec-butyl acrylate, tert-butyl acrylate, 2-hydroxyethyl acrylate, 2-hydroxypropyl acrylate, methyl methacrylate, ethyl methacrylate, n-propyl methacrylate, isopropyl methacrylate, n-butyl methacrylate, isobutyl methacrylate, sec-butyl methacrylate, tert-butyl methacrylate, 2-hydroxyethyl methacrylate, 2-hydroxypropyl methacrylate, epoxypropyl methacrylate, vinyl acetate, acrylonitrile, methyl acrylonitrile, 1,3-butadiene, isoamylene.

In one embodiment of the present invention, based on 100 parts by weight of the total used amount of the mixture, the used amount of the second unsaturated monomer (a-2) is 50 parts by weight to 95 parts by weight, preferably 55 parts by weight to 92 parts by weight, and more preferably 60 parts by weight to 90 parts by weight.

The compound containing the ethylenically unsaturated group (B) according to the present invention comprises a first compound (B-1), a second compound (B-2), or a combination thereof.

The first compound (B-1) is a (meth)acrylate compound obtained by reacting a caprolactone-modified polyol with a (meth)acrylic acid.

The caprolactone-modified polyol is obtained by reacting a caprolactone with a polyol containing more than 4 functional groups. The caprolactone may be γ-caprolactone, δ-caprolactone or ε-caprolactone, and wherein preferably is ε-caprolactone. The aforesaid polyol containing more than functional groups may be pentaerythritol, ditrimethylolpropane, dipentaerythritol and the like. The amount of the caprolactone is preferably 1 to 12 mol based on 1 mole of the polyol containing more than 4 functional groups.

Examples of the first compound (B-1) are pentaerythritol caprolactone-modified tetra(meth)acrylate, ditrimethylolpropane caprolactone-modified tetra(meth)acrylate, and dipentaerythritol caprolactone-modified poly(meth)acrylate; wherein the dipentaerythritol caprolactone-modified poly(meth)acrylate can be dipentaerythritol caprolactone-modified di(meth)acrylate, dipentaerythritol caprolactone-modified tri(meth)acrylate, dipentaerythritol caprolactone-modified tetra(meth)acrylate, dipentaerythritol caprolactone-modified penta(meth)acrylate, and dipentaerythritol caprolactone-modified hexa (meth)acrylate.

Preferably, the structure of the compound (B-1) obtained by reacting the caprolactone-modified caprolactone-modified polyol with the (meth)acrylic acid is represented by Formula (II):

(A), the used amount of the compound (B-1) obtained by reacting the caprolactone-modified caprolactone-modified polyol with the (meth)acrylic acid is represented by Formula (II) is 10 parts by weight to 150 parts by weight, preferably 15 parts by weight to 130 parts by weight, and more preferably 20 parts by weight to 100 parts by weight. When the photosensitive resin composition according to the present invention comprises the compound (B-1), the developability is better.

Preferably, the second compound (B-2) comprises a functional group represented by Formula (III):

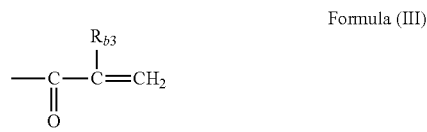

Formula (III)

$R_{b3}$ represents hydrogen or a methyl group.

Examples of the second compound (B-2) are acrylamide, (meth)acryloylmorpholine, 7-amino-3,7-dimethyloctyl (meth)acrylate, iso-butoxymethyl (meth)acrylamide, iso-bornyloxyethyl (meth)acrylate, iso-bornyl (meth)acrylate, 2-ethylhexyl (meth)acrylate, ethyl diethylene glycol (meth)acrylate, t-octyl (meth)acrylamide, diacetone (meth)acrylamide, dimethylaminoethyl (meth)acrylate, dodecyl (meth)acrylate, dicyclopentenyloxyethyl (meth)acrylate, dicyclopentenyl (meth)acrylate, N,N-dimethyl (meth)acrylamide, tetrachlorophenyl (meth)acrylate, 2-tetrachlorophenoxy ethyl (meth)acrylate, tetrahydrofurfuryl (meth)acrylate, tetrabromophenyl (meth)acrylate, 2-tetrabromophenoxyethyl (meth)acrylate, 2-trichlorophenoxyethyl (meth)acrylate, tribromophenyl (meth)acrylate, 2-tribromophenoxyethyl (meth)acrylate, 2-hydroxyethyl (meth)acrylate, 2-hydroxypropyl (meth)acrylate, vinylcaprolactam, N-vinylpyrrolidone, phenoxyethyl (meth)acrylate, pentachlorophenyl (meth)acrylate, pentabromophenyl (meth)acrylate, polyethylene glycol mono(meth)acrylate,

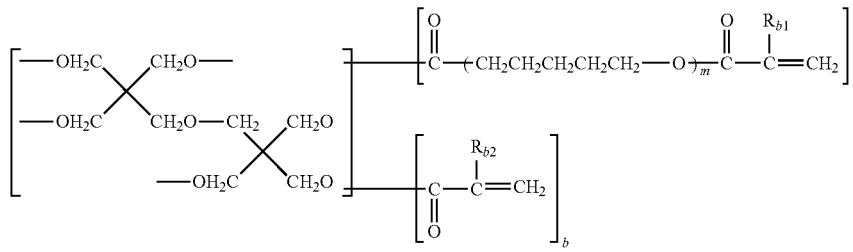

Formula (II)

wherein:
$R_{b1}$ and $R_{b2}$ independently represent hydrogen or a methyl group;
m represents an integer from 1 to 2; and
a+b=2 to 6, and a represents an integer from 1 to 6; b represents an integer from 0 to 5.

In one embodiment of the present invention, a+b=2 to 6; preferably a+b=3 to 6; more preferably a+b=6.

More particularly, the first compound (B-1) is KAYARAD® DPCA-20, DPCA-30, DPCA-60, DPCA-120 manufactured by Nippon Kayaku Co., Ltd.

In one embodiment of the present invention, based on 100 parts by weight of the used amount of the alkali-soluble resin polypropylene glycol mono(meth)acrylate, bornyl (meth)acrylate, ethylene glycol di(meth)acrylate, dicyclopentenyl di(meth)acrylate, triethylene glycol diacrylate, tetraethylene glycol di(meth)acrylate, tri(2-hydroxyethyl) isocyanate di(meth)acrylate, tri(2-hydroxyethyl) isocyanate tri(meth)acrylate, caprolactone-modified tri(2-hydroxyethyl) isocyanate tri(meth)acrylate, trimethylolpropyl tri(meth)acrylate, ethylene oxide (hereinafter abbreviated as EO) modified trimethylolpropyl tri(meth)acrylate, propylene oxide (hereinafter abbreviated as PO) modified trimethylolpropyl tri (meth)acrylate, tripropylene glycol di(meth)acrylate, neopentyl glycol di(meth)acrylate, 1,4-butanediol di(meth)acrylate, 1,6-hexanediol di(meth)acrylate, pentaerythritol tri (meth)acrylate, pentaerythritol tetra(meth)acrylate, polyester di(meth)acrylate, polyethylene glycol di(meth)acrylate, dipentaerythritol hexa(meth)acrylate, dipentaerythritol penta(meth)acrylate, dipentaerythritol tetra(meth)acrylate, caprolactone-modified dipentaerythritol hexa(meth)acrylate, caprolactone-modified dipentaerythritol penta(meth)acrylate, ditrimethylolpropyl tetra(meth)acrylate, EO-modified bisphenol A di(meth)acrylate, PO-modified bisphenol A di(meth)acrylate, EO-modified hydrogenated bisphenol A di(meth)acrylate, PO-modified hydrogenated bisphenol A di(meth)acrylate, PO-modified glycerol triacrylate, EO-modified bisphenol F di(meth)acrylate, phenol novolac polyglycidyl ether (meth)acrylate, or the like.

Preferably, the second compound (B-2) is selected from trimethylolpropyl triacrylate, EO-modified trimethylolpropyl triacrylate, PO-modified trimethylolpropyl triacrylate, pentaerythritol triacrylate, pentaerythritol tetracrylate, dipentaerythritol hexaacrylate, dipentaerythritol pentaacrylate, dipentaerythritol tetraacrylate, caprolactone-modified dipentaerythritol hexaacrylate, ditrimethylolpropyl tetraacrylate, PO-modified glycerol triacrylate and TO-1382 (manufactured by Toagosei Co., Ltd) or combinations thereof.

In one embodiment of the present invention, based on 100 parts by weight of the used amount of the alkali-soluble resin (A), the used amount of the compound containing the ethylenically unsaturated group (B) is 20 parts by weight to 200 parts by weight, preferably 30 parts by weight to 180 parts by weight, and more preferably 40 parts by weight to 150 parts by weight.

The photoinitiator (C) of the present invention can be selected from acetophenone, biimidazole, acyl oxime, or combinations thereof.

Examples of the acetophenone are p-dimethylamino-acetophenone, α,α'-dimethoxyazoxy-acetophenone, 2,2'-dimethyl-2-phenyl-acetophenone, p-methoxy-acetophenone, 2-methyl-1-(4-methylthio phenyl)-2-morpholino-1-propanone, and 2-benzyl-2-N,N-dimethylamino-1-(4-morpholinophenyl)-1-butanone.

Examples of the biimidazole are 2,2'-bis(o-chlorophenyl)-4,4',5,5'-tetraphenyl-biimidazole, 2,2'-bis(o-fluorophenyl)-4,4',5,5'-tetraphenyl-biimidazole, 2,2'-bis(o-methyl phenyl)-4,4',5,5'-tetraphenyl-biimidazole, 2,2'-bis(o-methoxyphenyl)-4,4',5,5'-tetraphenyl-biimidazole, 2,2'-bis(o-ethylphenyl)-4,4',5,5'-tetraphenyl-biimidazole, 2,2'-bis(p-methoxyphenyl)-4,4',5,5'-tetraphenyl-biimidazole, 2,2'-bis(2,2',4,4'-tetramethoxyphenyl)-4,4',5,5'-tetraphenyl-biimidazole, 2,2'-bis(2-chlorophenyl)-4,4',5,5'-tetraphenyl-biimidazole, and 2,2'-bis(2,4-dichlorophenyl)-4,4',5,5'-tetraphenyl-biimidazole.

Examples of the acyl oxime are ethanone,1-[9-ethyl-6-(2-methylbenzoyl)-9H-carbazole-3-yl]-,1-(O-acetyl oxime) which is shown as Formula (IV) (trade name of CGI-242, manufactured by Ciba Specialty Chemicals), 1-(4-phenyl-thio-phenyl)-octane-1,2-dion 2-oxime-O-benzoate which is shown as Formula (V) (trade name of CGI-142, manufactured by Ciba Specialty Chemicals), ethanone,1-[9-ethyl-6-(2-chloro-4-benzyl-thio-benzoyl)-9H-carbazole-3-yl]-,1-(O-acetyl oxime) which is shown as Formula (VI) (manufactured by Asahi Denka Co., Ltd);

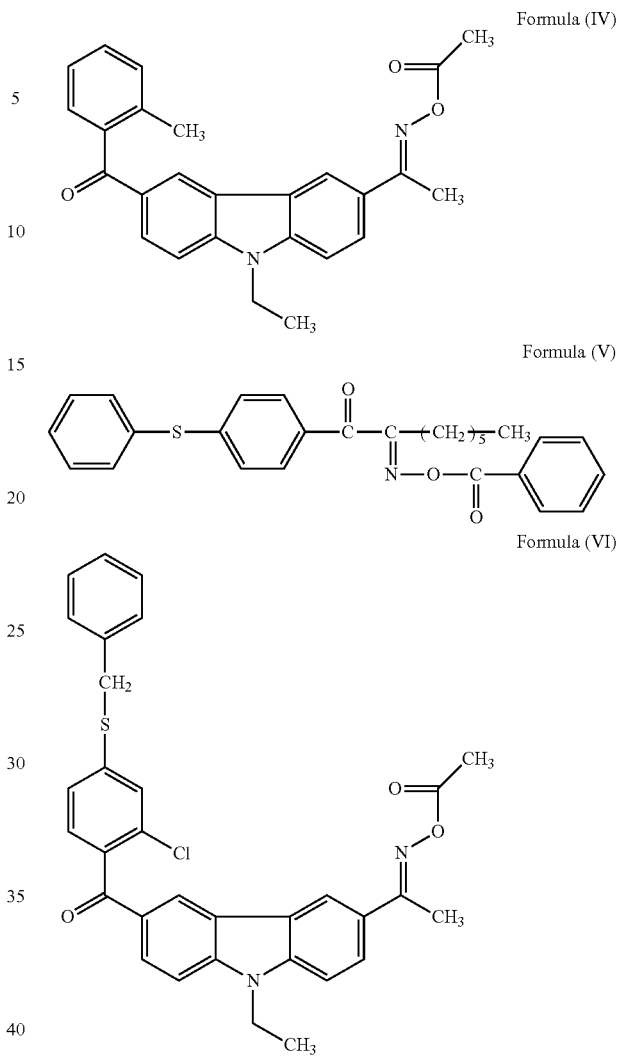

Preferably, the photoinitiator (C) is selected from 2-methyl-1-(4-methylthio phenyl)-2-morpholino-1-propanone, 2-benzyl-2-N,N-dimethylamino-1-(4-morpholinophenyl)-1-butanone, 2,2'-bis(o-chlorophenyl)-4,4',5,5'-tetraphenyl-biimidazole, ethanone,1-[9-ethyl-6-(2-methylbenzoyl)-9H-carbazole-3-yl]-,1-(O-acetyl oxime), or combinations thereof.

The photoinitiator (C) of the present invention can further comprise a compound as below: benzophenone-based compounds such as thioxanthone, 2,4-diethyl-thioxanthanone, thioxanthone-4-sulfone, benzophenone, 4,4'-bis(dimethylamino)benzophenone, and 4,4'-bis(diethylamino)benzophenone; α-diketone-based compounds such as benzil, and acetyl; acyloin-based compounds such as benzoin; acyloin ether-based compounds such as benzoin methylether, benzoin ethylether, and benzoin isopropyl ether; acylphosphineoxide-based compounds such as 2,4,6-trimethyl-benzoyl-diphenyl-phosphineoxide, and bis-(2,6-dimethoxy-benzoyl)-2,4,4-trimethyl-benzyl-phosphineoxide; quinone-based compounds such as anthraquinone, and 1,4-naphthoquinone; halid such as phenacyl chloride, tribromomethyl-phenylsulfone, and tris(trichloromethyl)-s-triazine; peroxide such as di-tertbutylperoxide; wherein, the benzophenone-based compounds is preferably, and 4,4'-bis(diethylamino)benzophenone is the more preferably.

In one embodiment of the present invention, based on 100 parts by weight of the used amount of the alkali-soluble resin (A), the used amount of the photoinitiator (C) is 10 parts by weight to 100 parts by weight, preferably 15 parts by weight to 90 parts by weight, and more preferably 20 parts by weight to 80 parts by weight.

The organic solvent (D) according to the present invention is able to dissolve the alkali-soluble resin, the compound containing the ethylenically unsaturated group, and the photoinitiator without reacting with the aforementioned compounds. Moreover, the organic solvent has suitable volatility.

Examples of the organic solvent (D) are (poly)alkylene glycol monoalkylether, such as ethylene glycol monomethylether, ethylene glycol monoethylether, diethylene glycol monomethylether, diethylene glycol monoethylether, diethylene glycol n-propylether, diethylene glycol n-butylether, triethylene glycol monomethylether, triethylene glycol monoethylether, propylene glycol monomethylether, propylene glycol monoethylether, dipropylene glycol monomethylether, dipropylene glycol monoethylether, dipropylene glycol n-propylether, dipropylene glycol n-butylether, tripropylene glycol monomethylether, tripropylene glycol monoethylether and the like; (poly)alkylene glycol monoalkylether acetate such as ethylene glycol monomethylether acetate, ethylene glycol monoethylether acetate, propylene glycol monomethylether acetate, propylene glycol monoethylether acetate and the like; ether such as diethylene glycol dimethyl ether, diethylene glycol ethyl methyl ether, diethylene glycol diethyl ether, tetrahydrofuran and the like; ketone such as methyl ethyl ketone, cyclohexanone, 2-heptanone, 3-heptanone and the like; lactic alkyoxycarbonyl such as methyl 2-hydroxypropanoate, ethyl 2-hydroxypropanoate and the like; ester such as methyl 2-hydroxy-2-methylpropionate, ethyl 2-hydroxy-2-methylpropionate, methyl 3-methoxypropionate, ethyl 3-methoxypropionate, methyl 3-ethoxypropionate, ethyl 3-ethoxypropionate, ethoxy ethyl acetate, hydroxy ethyl acetate, methyl 2-hydroxy-3-methylbutyrate, 3-methyl-3-methoxybutyl acetate, 3-methyl-3-methoxybutyl acrylic acid, ethyl acetate, n-butyl acetate, n-propyl acetate, isopropyl acetate, isobutyl acetate, n-pentyl acetate, isopentyl acetate, n-butyl propionate, ethyl butyrate, n-propyl butyrate, isopropyl butyrate, n-butyl butyrate, methyl pyruvate, ethyl pyruvate, n-propyl pyruvate, methyl acetoacetate, ethyl acetoacetate, 2-oxide-butyric acid ethyl ester and the like; aromatic hydrocarbons such as toluene, dimethylbenzene and the like; carboxylic acid amide such as N-methyl-pyrrolidinone, N,N-dimethyl formamide, N,N-dimethyl acetamide and the like.

Preferably, the organic solvent (D) is propylene glycol monomethylether acetate, ethyl 3-ethoxypropionate or in combinations of two or more.

In one embodiment of the present invention, based on 100 parts by weight of the used amount of the alkali-soluble resin (A), the used amount of the organic solvent (D) is 500 parts by weight to 5000 parts by weight, preferably 800 parts by weight to 4500 parts by weight, and more preferably 1000 parts by weight to 4000 parts by weight.

The pigment (E) according to present invention can be an inorganic pigment, an organic pigment or a combination thereof.

The aforementioned inorganic pigment is a metallic compound such as a metallic oxide compound, metallic complex salt and the like. Examples of the inorganic pigment is selected from a metallic oxide compound and complex oxide compound containing iron, cobalt, aluminum, cadmium, lead, copper, titanium, magnesium, chromium, zinc, antimony and the like.

The aforementioned organic pigment is selected from C.I. pigment yellow 1, 3, 11, 12, 13, 14, 15, 16, 17, 20, 24, 31, 53, 55, 60, 61, 65, 71, 73, 74, 81, 83, 93, 95, 97, 98, 99, 100, 101, 104, 106, 108, 109, 110, 113, 114, 116, 117, 119, 120, 126, 127, 128, 129, 138, 139, 150, 151, 152, 153, 154, 155, 156, 166, 167, 168, 175; C.I. pigment orange 1, 5, 13, 14, 16, 17, 24, 34, 36, 38, 40, 43, 46, 49, 51, 61, 63, 64, 71, 73; C.I. pigment red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48:1, 48:2, 48:3, 48:4, 49:1, 49:2, 50:1, 52:1, 53:1, 57, 57:1, 57:2, 58:2, 58:4, 60:1, 63:1, 63:2. 64:1, 81:1, 83, 88, 90:1, 97, 101, 102, 104, 105, 106, 108, 112, 113, 114, 122, 123, 144, 146, 149, 150, 151, 155, 166, 168, 170, 171, 172, 174, 175, 176, 177, 178, 179, 180, 185, 187, 188, 190, 193, 194, 202, 206, 207, 208, 209, 215, 216, 220, 224, 226, 242, 243, 245, 254, 255, 264, 265; C.I. pigment purple 1, 19, 23, 29, 32, 36, 38, 39; C.I. pigment blue 1, 2, 15, 15:3, 15:4, 15:6, 16, 22, 60, 66; C.I. pigment green 7, 36, 37; C.I. pigment brown 23, 25, 28; and C.I. pigment black 1, 7.

An average particle size of primary particle of the pigment (E) is 10 nm to 200 nm, preferably 20 nm to 150 nm, more preferably 30 nm to 130 nm.

Alternatively, the pigment (E) selectively comprises a dispersing agent, for example, a surfactant such as a cationic surfactant, anionic surfactant, nonionic surfactant, amphoteric surfactant, polysiloxane surfactant, fluorine surfactant and the like.

The aforementioned surfactant can be used alone or in combination of two or more selected from follows: polyoxyethylene alkyl ether such as polyoxyethylene lauryl ether, polyoxyethylene stearyl ether amide, polyoxyethylene oleyl ether and the like; polyoxyethylene alkyl ether surfactant such as polyoxyethylene octyl phenyl ether, polyoxyethylene nonyl phenyl ether and the like; polyethylene glycol diester such as polyethylene glycol bislaurate, polyoxyethylene stearate and the like; sorbitan fatty acid ester surfactant; fatty acid modified polyester surfactant; tertiary amines modified polyurethane surfactant; a product made by Shin-Etsu Chemical Co., Ltd., and the trade name is KP; a product made by Toray Dow Corning Silicon Co., Ltd., and the trade name is SF-8427; a product made by Kyoeisha Chemical Co., Ltd., and the trade name is Polyflow; a product made by Tochem Products Co., Ltd., and the trade name is F-Top; a product made by Dainippon Ink and Chemicals Co., Ltd., and the trade name is Megafac; a product made by Sumitomo 3M Co., Ltd., and the trade name is Fluorade; a produce made by Asahi Glass Co., Ltd., and the trade name is Asahi Guard or Surflon.

In one embodiment of the present invention, based on 100 parts by weight of the used amount of the alkali-soluble resin (A), the used amount of the pigment (E) is 20 parts by weight to 200 parts by weight, preferably 30 parts by weight to 180 parts by weight, and more preferably 40 parts by weight to 150 parts by weight.

The compound (F) according to the invention is represented by Formula (I);

Formula (I)

wherein:
R$^1$ is selected from the group consisting of hydrogen, halogen, a nitro group, a hydrocarbyl group and

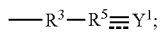

wherein R$^1$ is a hydrocarbyl group substituted or interposed with a functional group;
R$^2$ and R$^3$ are independently selected from the group consisting of (CR$^7$R$^8$)$_n$, CR$^9$R$^{10}$, CR$^7$R$^8$CR$^9$R$^{10}$ and CR$^9$R$^{10}$CR$^7$R$^8$;
n is 0, 1 or 2;
R$^7$ and R$^8$ are independently selected from the group consisting of hydrogen, halogen and a hydrocarbyl group;
either one of R$^9$ or R$^{10}$ is hydrogen and the other is an electron withdrawing group, or R$^9$ and R$^{10}$ together form an electron withdrawing group;
R$^4$ and R$^5$ are independently selected from the group consisting CH and CR$^{11}$;
R$^{11}$ is an electron withdrawing group;
the dotted line indicates the presence or absence of a bond;
X$^1$ is a CX$^2$X$^3$ group where the dotted line bond to which it is attached is absent; X$^1$ is a CX$^2$ group where the dotted line bond to which it is attached is present;
Y$^1$ is a CY$^2$Y$^3$ group where the dotted line bond to which it is attached is absent; Y$^1$ is a CY$^2$ group where the dotted line bond to which it is attached is present;
X$^2$, X$^3$, Y$^2$ and Y$^3$ are independently selected from the group consisting hydrogen, fluorine, a hydrocarbyl group, an alkyl group, an aryl group and a heterocyclic group; and
R$^{13}$ is C(O) or S(O)$_2$.

As used herein, the term "alkyl" refers to a straight or branched chain alkyl group, suitably containing up to 20 and preferably up to 6 carbon atoms. The terms "alkenyl" and "alkynyl" refer to unsaturated straight or branched chains which include for example from 2 to 20 carbon atoms, for example from 2 to 6 carbon atoms. Chains may include one or more double to triple bonds respectively. In addition, the term "aryl" refers to aromatic groups such as phenyl or naphthyl.

The term "hydrocarbyl" refers to any structure comprising carbon and hydrogen atoms. For example, these may be alkyl, alkenyl, alkynyl, aryl such as phenyl or napthyl, arylalkyl, cycloalkyl, cycloalkenyl or cycloalkynyl. Suitably they contain up to 20 and preferably up to 10 carbon atoms. The term "heterocylyl" includes aromatic or non-aromatic rings, for example containing from 4 to 20, suitably from 5 to 10 ring atoms, at least one of which is a heteroatom such as oxygen, sulphur or nitrogen. Examples of such groups include furyl, thienyl, pyrrolyl, pyrrolidinyl, imidazolyl, triazolyl, thiazolyl, tetrazolyl, oxazolyl, isoxazolyl, pyrazolyl, pyridyl, pyrimidinyl, pyrazinyl, pyridazinyl, triazinyl, quinolinyl, isoquinolinyl, quinoxalinyl, benzthiazolyl, benzoxazolyl, benzothienyl, or benzofuryl.

The term "functional group" refers to reactive groups such as halo, cyano, nitro, oxo, C(O)R$^a$, OR$^a$, S(O)$_t$R$^a$, NR$^b$R$^c$, OC(O)NR$^b$R$^c$, C(O)NR$^b$R$^c$, OC(O)NR$^b$R$^c$, —NR$^7$C(O)$_n$R$^6$, —NR$^a$CONR$^b$R$^c$, —NR$^a$CSNR$^b$R$^c$, —C=NOR$^a$, —N=CR$^b$R$^c$, S(O)$_t$NR$^b$R$^c$, C(S)$_n$R$^a$, C(S)OR$^a$, C(S)NR$^b$R$^c$ or —NR$^b$S(O)$_t$R$^a$; where R$^a$, R$^b$ and R$^c$ are independently selected from hydrogen or optionally substituted hydrocarbyl, or R$^b$ and R$^c$ together form an optionally substituted ring which optionally contains further heteroatoms such as sulphur, oxygen and nitrogen; n is an integer of 1 or 2; t is 0 or an integer of 1 to 3. In particular, the functional groups are groups such as halo, cyano, nitro, oxo, C(O)$_n$R$^a$, OR$^a$, S(O)$_t$R$^a$, NR$^b$R$^c$, OC(O)NR$^b$R$^c$, C(O)NR$^b$R$^c$, OC(O)NR$^b$R$^c$, —NR$^7$C(O)$_n$R$^6$, —NR$^a$CONR$^b$R$^c$, —C=NOR$^a$, —N=CR$^b$R$^c$, S(O)$_t$NR$^b$R$^c$, or —NR$^b$S(O)$_t$R$^a$ where R$^a$, R$^b$, R$^c$, n and t are as defined above.

The term "heteroatom" as used herein refers to non-carbon atoms such as oxygen, nitrogen or sulphur atoms, where the nitrogen atoms are present, they are generally present as part of an amino residue so that they will be substituted for example by hydrogen or alkyl.

The term "amide" is generally understood to refer to a group of formula C(O)NR$^a$R$^b$ where R$^a$ and R$^b$ are hydrogen or an optionally substituted hydrocarbyl group. Similarly, the term "sulphonamide" refers to a group of formula S(O)$_2$NR$^a$R$^b$. Suitable groups R$^a$ include hydrogen or methyl, in particular hydrogen.

The nature of any electron withdrawing group or groups additional to the amine moiety used in any particular case depends upon its position in relation to the double bond it is required to activate, as well as the nature of any other functional groups within the compound. The term "electron withdrawing group" includes within its scope atomic substituents such as halo, e.g. fluoro, chloro and bromo, and also molecular substituents such as nitrile, trifluoromethyl, acyl such as acetyl, nitro, or carbonyl.

In Formula (I), wherein R$^{11}$ is an electron withdrawing group, it is suitably acyl such as acetyl, nitrile or nitro.

Preferably, R$^7$ and R$^8$ are independently selected from fluoro, chloro or alkyl or hydrogen. In the case of alkyl, methyl is preferred.

Preferably, X$^2$, X$^3$, Y$^2$ and Y$^3$ are all hydrogen.

Alternatively, it is possible that at least one, and possibly all, of X$^2$, X$^3$, Y$^2$ and Y$^3$ is a substituent other than hydrogen or fluorine, in which instance it is preferred that at least one, and possibly all, of X$^2$, X$^3$, Y$^2$ and Y$^3$ is an optionally substituted hydrocarbyl group. In such embodiments, it is preferred that at least one, and most preferably all, of X$^2$, X$^3$, Y$^2$ and Y$^3$ is an optionally substituted alkyl group. Particularly preferred examples are C$_1$ to C$_4$ alkyl groups, especially methyl or ethyl. Alternatively, at least one, and preferably all, of X$^2$, X$^3$, Y$^2$ and Y$^3$ are aryl and/or heterocyclic such as pyridyl, pyrimidinyl, or a pyridine or pyrimidine containing group.

In one preferred embodiment, R$^1$ is

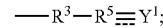

X$^1$ and Y$^1$ are groups CX$^2$X$^3$ and CY$^2$Y$^3$ respectively and the dotted lines represent an absence of a bond. In these embodiments, the polymerisation may proceed by a cyclopolymerisation reaction.

A preferred polymeric precursor is containing a compound represented by Formula (I-1); more preferred polymeric precursor is containing a compound represented by Formula (I-2):

Formula (I-1)

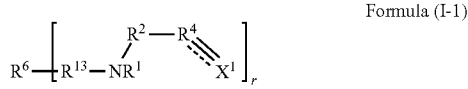

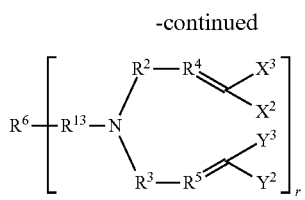

Formula (I-2)

wherein r is an integer of 1 or more and $R^6$ is one or more of a binding group, an optionally substituted hydrocarbyl group, a perhaloalkyl group, a siloxane group, an amide, or a partially polymerised chain containing repeat units.

Where in a compound of Formula (I-1) and Formula (I-2), r is 1, the compound can be readily polymerised to form a variety of polymer types depending upon the nature of the group $R^6$. Embodiments in which r is 1 or 2 are more preferred.

Where in the compounds of Formula (I-1), r is greater than one, polymerisation can result in polymer networks. On polymerisation of these compounds, networks are formed whose properties maybe selected depending upon the precise nature of the $R^6$ group, the amount of chain terminator present and a polymerisation conditions employed.

Preferably, r is 1, 2, 3 or 4.

Preferably, $R^6$ comprises a straight or branched chain hydrocarbyl group, optionally substituted or interposed with a functional group. Advantageously, the straight or branched chain hydrocarbyl is interposed or substituted with one or more of an amine moiety, C(O) or COOH.

In some embodiments, the polymeric precursor is a monomer in which $R^6$ is a straight or branched chain hydrocarbyl interposed with an amine moiety, or a pre-polymer obtained by a pre-polymerisation of the monomer. Preferably, the monomer is a straight or branched chain alkyl group containing 1 to 30 carbon atoms, optionally interposed with a cyclic group. More preferably, the monomer is a compound of Formula (I-3):

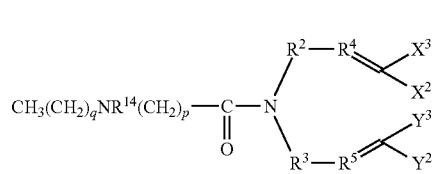

Formula (I-3)

wherein $R^{14}$ is H or $C_sH_{2s+1}$, p is 1 to 10, q is 0 to 10 and s is 1 to 10.

In other preferred embodiments, the monomer is a compound of Formula (I-4):

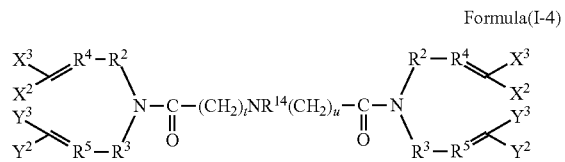

Formula (I-4)

wherein t and u independently represent 1 to 10, and $R^{14}$ is H or $C_sH_{2s+1}$ and s is 1 to 10.

In other preferred embodiments, the polymeric precursor is a monomer in which $R^6$ is a straight or branched chain hydrocarbyl substituted with a COOH end group, or a pre-polymer obtained by the pre-polymerisation of the monomer. The monomer may be a straight or branched chain alkyl group containing 1 to 30 carbon atoms, optionally interposed with a cyclic group. In other embodiments, the polymeric precursor is a monomer in which $R^6$ is a straight or branched chain alkyl group containing 1 to 30 carbon atoms, or a pre-polymer obtained by a pre-polymerisation of the monomer.

In other preferred embodiments, the monomer is a compound of Formula (I-5):

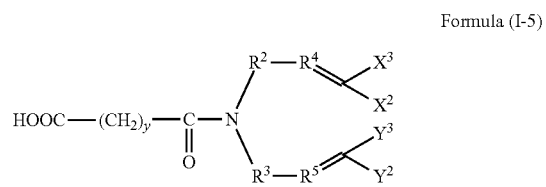

Formula (I-5)

wherein v is 1 to 20.

In other embodiments, the polymeric precursor is a monomer in which $R^6$ is a straight or branched chain alkyl group containing 1 to 30 carbon atoms, or a pre-polymer obtained by the pre-polymerisation of the monomer.

In other embodiments, the polymeric precursor is a monomer in which $R^6$ is a partially or per-halogenated straight or branched chain alkyl group containing 1 to 30 carbon atoms, or a pre-polymer obtained by a pre-polymerisation of the monomer.

In other embodiments, the polymeric precursor is a monomer in which $R^{13}$ is CO and $R^6$ terminates in one or more amine moieties forming a urea structure, or a pre-polymer obtained by a pre-polymerisation of the monomer.

In further embodiments, the polymeric precursor is a monomer of Formula (I-6):

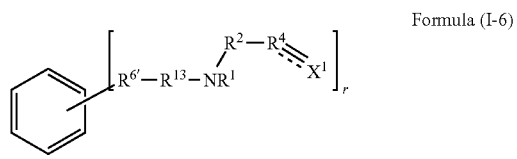

Formula (I-6)

wherein $R^6$ is a straight or branched chained hydrocarbyl group, optionally substituted or interposed with a functional group; and r is an integer of two or more, or a pre-polymer obtained by a pre-polymerisation of the monomer. Preferably, r is two or three.

The step of polymerising the polymeric precursor may produce a homopolymer.

Alternatively, the step of polymerising the polymeric precursor may produce a copolymer, the polymeric precursor being mixing with one or more other polymeric precursor. The other polymeric precursor may be according to any of the Formula described herein. Alternatively, the co-monomer may be of a different kind of compounds.

In one embodiment of the present invention, based on 100 parts by weight of the used amount of the alkali-soluble resin (A), the used amount of the compound (F) represented by Formula (I) is 20 parts by weight to 200 parts by weight, preferably 30 parts by weight to 150 parts by weight, and more preferably 40 parts by weight to 100 parts by weight.

When the compound (F) represented by Formula (I) is excluded, the hardness and sputtered resistance is poor.

The photosensitive resin composition of the present invention may optionally further include an additive. The additives may be, for example, a surfactant, a filler, a high-molecular compound (excluded the alkali-soluble resin), an adhesion auxiliary agent, an antioxidant, a UV-absorption agent, an anti-agglutinating agent and the like.

Wherein, the surfactant can improve the coating of the photosensitive composition for the color filter. Examples of the aforementioned the surfactant are the same to the surfactants used accompanied with the pigment; based on 100 parts by weight of the used amount of the alkali-soluble resin (A), the used amount of the surfactant is 0 part by weight to 6 parts by weight, preferably 0 part by weight to 4 parts by weight, and more preferably 0 part by weight to 3 parts by weight.

The filler includes glass, alumina, or the like. Examples of the high-molecular compound include polyvinyl alcohol, polyethylene glycol monoalkyl ether, polyfluoro alkyl acrylate, or the like. Examples of the adhesion agents include vinyltrimethoxysilane, vinyltriethoxysilane, vinyltris(2-methoxyethoxy)silane, N-(2-aminoethyl)-3-aminopropylmethyldimethoxysilane, N-(2-aminoethyl)-3-aminopropyltrimethoxysilane, 3-aminopropyltriethoxysilane, 3-glycidyloxypropyltrimethoxysilane, 3-glycidyloxypropylmethyldimethoxysilane, 2-(3,4-epoxycyclohexyl)ethyltrimethoxysilane, 3-chloropropylmethyldimethoxysilane, 3-chloropropyltrimethoxysilane, 3-methacryloxypropyltrimethoxysilane, 3-mercaptopropyltrimethoxysilane, or the like. Examples of the antioxidants include 2,2-thiobis(4-methyl-6-t-butylphenol), 2,6-di-t-butylphenol, or the like. Examples of the UV absorbents include 2-(3-t-butyl-5-methyl-2-hydroxyphenyl)-5-chlorobenzotriazole, alkoxybenzophenone, or the like. Examples of the anti-coagulant include sodium polyacrylate, or the like.

Based on 100 parts by weight of the used amount of the alkali-soluble resin (A), the used amount of the additive is 0 part by weight to 10 parts by weight, preferably 0 part by weight to 6 parts by weight, and more preferably 0 part by weight to 3 parts by weight.

The present invention also provides a method for manufacturing a color filter comprising forming a pixel layer with the photosensitive resin composition as mentioned above.

The present invention also provides a color filter is manufactured by the method as mentioned above.

The present invention further provides a liquid crystal display device comprising the color filter as mentioned above.

In the method for forming the color filter, the aforementioned solution state of the photosensitive resin composition is coated on a substrate by various coating methods, for example, spin-coating, cast coating or roll coating and the like. The substrate includes but not limited to alkali-free glass, Na—Ca glass, hard glass (Pyrex glass), quartz glass or that having an electrically conductive transparent film disposed thereon; a substrate of light-to-electricity conversion (for example, silicone substrate) utilized in a solid-camera device and the like. Before the photosensitive resin composition is coated on the substrate, the black matrix for separating the pixel color layers of red, green, blue has been formed on the substrate.

After coating process, the photosensitive resin composition is dried under reduced pressure to remove most of the solvent. After completely evaporating the residual solvent by pre-baking, a coating film is formed. Operation conditions for the drying under reduced pressure and the pre-baking depend on kinds and amounts of the components used in the photosensitive resin composition. In general, the drying under reduced pressure is carried out at a pressure from 0 to 200 mm Hg for a period from 1 to 60 seconds. The pre-baking is carried out at a temperature from 70° C. to 110° C. for a period from 1 to 15 minutes.

After pre-baking, the coated film is exposed under a mask having specific patterns. The exposure light is preferably UV light such as g-line, h-line, i-line and so on, which may be generated by a UV illumination device such as (super) high-pressure mercury lamp or metal halide lamp.

After exposing process, the coated film is immersed in a developing solution at 23±2° C. for 15 seconds to 5 minutes, thereby remove undesired areas and forming a given pattern. The developing solution includes but not limited to alkaline compounds such as sodium hydroxide, potassium hydroxide, sodium carbonate, sodium hydrogen carbonate, potassium carbonate, potassium hydrogen carbonate, sodium silicate, sodium methyl silicate, ammonia solution, ethylamine, diethylamine, dimethylethylanolamine, tetramethylammonium hydroxide, tetraethylammonium hydroxide, choline, pyrrole, piperidine, 1,8-diazabicyclo-[5,4,0]-7-undecene and the like. The concentration of the developing solution is 0.001 weight percent (wt %) to 10 wt %, preferably 0.005 wt % to 5 wt %, and more preferably 0.01 wt % to 1 wt %.

Thereafter, the patterns on the substrate are washed by water, and then dried by using compressed air or nitrogen gas. Then, the patterns are subjected to a post-bake process with heating device such as a hot plate or an oven. The post-bake process can be carried out at 150° C. to 250° C. for 5 to 60 minutes on the hot plate or for 15 to 150 minutes in the oven, thereby curing the patterns and forming a pixel color layer.

The pixel color layers such as red, green, blue and the like can be formed on the substrate by repeating the aforementioned steps.

An ITO protective film is sputtered on the surface of the pixel color layer at 220° C. to 250° C. under vacuum environment. The ITO protective film is etched and patterned if necessary, and then an alignment film is applied on the surface of the ITO protective film, so as to produce the color filter of the present invention.

The liquid crystal display device of the present invention comprises the color filter as mentioned above.

The liquid crystal display device, for example liquid crystal panel, comprises the aforementioned color filter. A glass substrate which have been inlaid with a thin film transistor (TFT) and been applied with an alignment film is disposed opposite to the aforementioned color filter, and spacers are disposed between the glass substrate and the color filter. Next, liquid crystal molecules are injected into the space. And then, polarized plates are respectively adhered on the outer surface of the color filter and the glass substrate, so as to produce the liquid crystal display device.

The present invention will provide more details hereinafter in the following embodiments, but it should be understood that these examples are only illustrative and for illustrative purposes and should not be construed to limit the present invention.

Synthesis Example of Alkali-Soluble Resin (A)

Hereinafter, the alkali-soluble resin (A) of Synthesis Examples A-1 to A-6 were prepared according to Table 1 as follows:

Synthesis Example A-1

A 1000 mL four-necked conical flask equipped with a nitrogen inlet, a stirrer, a heater, a condenser and a thermometer was purged with nitrogen gas. According to Table 1, the kinds and the mixing ratio of the components were prepared to synthesis the alkali-soluble resin (A). The aforementioned components comprised the first unsaturated monomer, the second unsaturated monomer, the polymerized initiator and the solvent.

During polymerization, 5 parts by weight of 2-methacryloyloxyethyl succinate monoester (HOMS), 5 parts by weight of dicyclopentenyl acrylate (FA-511A), 40 parts by weight of styrene monomer (SM) and 50 parts by weight of methyl methacrylate (MMA) were firstly added into the four-necked conical flask and stirred to form a solution state. Simultaneously, the oil bath temperature of the four-necked conical flask was elevated to 100° C. Furthermore, 6 parts by weight of 2,2'-azobis-2-methyl butyronitrile (AMBN) was dissolved in 200 parts by weight of ethyl 3-ethoxypropionate (EEP), and the solution containing AMBN was separated to five equal parts. One of the five parts was added into the four-necked conical flask every one hour. The reaction temperature of the polymerization process was kept 100° C., and the polymerization time was continued for 6 hours. After the polymerization process, the polymerized product was taken out, and the solvent was volatilized, so as to obtain the alkali-soluble resin (A-1).

Synthesis Example A-2 to A-6

Synthesis Examples A-2 to A-6 were synthesized with the same method as in Synthesis Example A-1 by using various kinds or amounts of the reactants for the alkali-soluble resin (A). The formulations of Synthesis Examples A-2 to A-6 were listed in Table 1 rather than focusing or mentioning them in details.

Synthesis Example of Compound (F) Represented by Formula (I)

Synthesis Example F-1

N,N-diallyl-3-(propylamino)propanamide 3-bromopropionylchloride in dichloromethane (1:1 v/v) was added drop wise to a slight molar excess of diallylamine in dichloromethane (DCM) at about 10° C. over 2 hours with constant stirring. This was then washed in dilute HCl and dichloromethane and the organic fraction retained. The solution of product in DCM was then purified by column chromatography using silica (60A) and the DCM removed to yield the 3-bromo-N,N-diallylpropylamide intermediate; a yellow liquid. Yield 70%.

The 3-bromo-N,N-diallylpropylamide intermediate (30 g, 129 mmoles) was added to THF (1:1 v/v). This was then added dropwise over 2 hours into a stirred, refluxing mixture of 1-propylamine (43.1 g, 0.730 mmoles), potassium carbonate (90 g, 0.652 mmoles) and THF (133.6 g, 1.850 mmoles). The reflux was then left to cool over 1 hour with constant stirring.

The cooled reaction mixture was washed in water (400 ml), dissolving the potassium carbonate and leaving a clear, yellow organic top layer, which was decanted off. This layer was then washed again in water, separated and dried to yield a yellow liquid N,N-diallyl-3-(propylamino)propanamide product. Yield about 65%.

Synthesis Example F-2

N,N,N,N-tetraallylethanediamide

Fresh, dry oxaloyl chloride (ClOOCCOOCl) (200 mmoles) was placed into a 3-necked round bottomed (RB) flask with 200 ml of dry dichloromethane. Freshly distilled diallylamine (400 mmoles) was added to triethylamine (400 mmoles), further diluted (1:1 v/v) in dry dichloromethane then added into a dropping funnel and placed onto the reaction flask. Nitrogen gas was pumped through the vessel through the other two necks. To neutralise HCl produced, the waste gas was bubbled through a $CaCO_3$ solution. The reaction vessel was then placed into a salt water/ice bath and once the contents were cooled the diallylamine/triethylamine/DCM was added dropwise to the acid chloride solution with continual magnetic stirring of the mixture. The temperature was monitored and maintained between 5 to 10° C. The dropping of the diallylamine and triethylamine was stopped after three hours and the reaction was left to stir for another hour.

Thin layer chromatography using ethyl acetate and an alumina was used to monitor the reaction comparing starting material to the product. Iodine was used to develop the plate and the reaction product could be seen as a spot that had been eluted much further than the starting material.

To remove the amine chloride and excess diallylamine the reaction liquor was washed in 3M HCl. The monomer stayed in the DCM fraction and was removed using a separating funnel. Two washes of 100 ml HCl were used. The solvent was then removed in a rotary evaporator.

The product was added to dichloromethane (1:1 v/v) and passed through a silica gel (Merck, grade 60 for chromatography) column with dichloromethane as the eluent.

Synthesis Example F-3 benzene-1,2,4-tricarboxylic acid-tris-N,N-diallylamide

A mixture of N,N-diallylamine (128.26 g, 1.32 moles) and dichloromethane (106.0 g, 1.248 moles) was added to a funnel and added dropwise over 75 minutes to a reaction vessel containing a cooled mixture (10° C.) of 1,3,5-trimesoyl chloride (53.1 g, 0.200 moles) in dichloromethane (530.0 g, 6.24 moles) with constant stirring. The temperature was maintained at <10° C. for the duration of the addition of the diallylamine solution and then left to return to room temperature over another 60 minutes with constant stirring. The organic reaction product was then washed with an excess of water (1×600 ml and 2×300 ml) to remove the hydrochloride salt of the diallylamine, followed by drying over $MgSO_4$. Solids were then filtered off and the solvent removed under vacuum. The crude product was then purified by column chromatography using a silica column and dichloromethane as eluent. The dichloromethane was again removed under vacuum to yield a pale yellow, viscous product. Yield 60.2%.

Synthesis Example F-4

2,2',2'',2'''-(ethane-1,2-diylbis(azanetriyl))tetrakis(N,N-diallylacetamide)

A mixture of 4-dimethylamino pyridine (0.5 g), dicyclohexylcarbodiimide (103.0 g), ethylenediamine tetraacetic acid (36.0 g), diallylamine (53.0 g) and dichloromethane (250 g) was added to a reaction vessel maintained at approximately 20° C. for 120 hours with constant stirring. Solids, including urea formed in the reaction, were then removed by filtration followed by the removal of amine and solvent under vacuum. After removal of impurities a clear, viscous oil was obtained (about 65%).

Synthesis Example F-5

N,N-diallylhexanamide

A mixture of diallylamine (>99%, 70.85 g), dichloromethane (265.0 g) and triethylamine (>98%, 73.4 g) was added dropwise to a stirred mixture of hexanoyl chloride (>98%, 96.15 g) and dichloromethane (530.0 g) over 195 minutes with temperature maintained between 0 to 10° C. Following this the reaction vessel was allowed to warm to room temperature with stirring of the mixture maintained for a further 60 minutes. The resulting reaction liquor was washed in HCl (3M, 600 ml) and the organic phase separated and dried over anhydrous $MgSO_4$. After filtration, volatiles including the dichloromethane, were removed under vacuum and the crude product further purified by column chromatography using silica and ethyl acetate as eluent. Ethyl acetate was removed from the product under vacuum to yield a yellow oil, yield 64%.

Synthesis Example F-6

N,N-diallyl-2-(butyl-diallylcarbamoylmethylamino) acetamide

Chloroacetyl chloride (>98%, 212 g, 1.883 moles) and dichloromethane (397.5 g, 4.680 moles) were added to a reaction vessel and cooled to 5° C. N,N diallylamine (freshly distilled, 402.57 g, 4.143 moles) was added to dichloromethane (397.5 g, 4.680 moles) and this mixture was then added dropwise to the chloroacetyl chloride mixture over several hours with constant stirring with the temperature kept below 10° C. The reaction mixture was then left to reach room temperature and then washed in water (1.5l). The organic phase was washed again in water, followed by separation of the organic phase. Solvent and volatiles were then removed from the organic phase under vacuum to yield a yellow oil, which was further purified by column chromatography with ethyl acetate eluent and silica. Eluent was removed under vacuum to yield a yellow oil. Yield about 78%.

N,N-diallyl-2-chloroacetamide (intermediate) (86.75 g, 0.500 moles), triethylamine (154.38 g, 1.500 moles) and tetrahydrofuran (222.25 g, 3.082 moles) were charged into a reaction flask with 1-butylamine (99%, 18.29 g, 0.250 moles) added dropwise over 15 minutes with constant stirring. The temperature of the reaction was brought to reflux and maintained for 4 hours. The reaction was then cooled to room temperature followed by filtration of the triethylamine hydrochloride salt from the reaction liquor. After removal of solvent under vacuum the product was added to dichloromethane (200 ml) and then washed twice in water (300 ml). The organic phase was separated, dried with magnesium sulfate and filtered. This was followed by removal of solvent under vacuum to yield a pale yellow oil. Yield 88%.

Examples and Comparative Examples of Photosensitive Resin Composition

Example 1

100 parts by weight of the alkali-soluble resin (A-1), 10 parts by weight of DPCA-120 (hereinafter abbreviated as B-1-1), 10 parts by weight of DPHA (hereinafter abbreviated as B-2-1), 2 parts by weight of 2-methyl-1-(4-methylthiophenyl)-2-morpholino-1-propanone (hereinafter abbreviated as C-1), parts by weight of 2,2'-bis(2,4-dichlorophenyl)-4, 4',5,5'-tetraphenyl-biimidazole (hereinafter abbreviated as C-2), 3 parts by weight of 4,4'-bis(diethylamino)benzophenone (hereinafter abbreviated as C-3), 20 parts by weight of C. I. Pigment R254/C. I. Pigment Y139=80/20 (hereinafter abbreviated as E-1), and 20 parts by weight of (F-1) were added into 500 parts by weight of propylene glycol monomethyl ether acetate (hereinafter abbreviated as D-1). The aforementioned components were mixed in a conventional mixer uniformly, so as to obtain the photosensitive resin composition for color filter. The resulted photosensitive resin composition was evaluated according to the following evaluation methods, and the result thereof was listed as Table 1.

TABLE 1

| Synthesis Example of alkali-soluble resin (A) | | | | | | | | | | |
|---|---|---|---|---|---|---|---|---|---|---|
| Composition (parts by weight) | | | | | | | | | | |
| | Monomer for polymerization | | | | | | | | | |
| Synthesis | (a-1) | | | (a-2) | | | | | Initiator | Solvent |
| Example | HOMS | MAA | AA | FA-511A | FA-512A | SM | BzMA | MMA | MA | AMBN | EEP |
| A-1 | 5 | | | 5 | | 40 | | 50 | | 6 | 200 |
| A-2 | | 15 | | | 10 | | 20 | | 55 | 5.5 | 200 |
| A-3 | | | 25 | 15 | | 20 | | 40 | | 6 | 200 |
| A-4 | 30 | 5 | | | 10 | | 45 | | 10 | 5 | 200 |
| A-5 | | 20 | 20 | | | 40 | | 20 | | 6 | 200 |
| A-6 | 50 | | | | | | 20 | | 30 | 6 | 200 |

HOMS 2-methacryloyloxyethyl succinate monoester
MAA methacrylic acid
AA acrylic acid
FA-511A dicyclopentenyl acrylate
FA-512A dicyclopentenyl ethoxy acrylate
SM styrene monomer
BzMA benzyl methacrylate
MMA methyl methacrylate
MA methacrylate
AMBN 2,2'-azobis-2-methyl butyronitrile
EEP ethyl 3-ethoxypropionate Examples 2 to 7 and Comparative Examples 1 to 4

Examples 2 to 7 and comparative examples 1 to 4 were practiced with the same method as in Example 1 by using various kinds or amounts of the components for the photosensitive resin composition. The formulations and detection results thereof were listed in Table 2 and Table 3 rather than focusing or mentioning them in details.

Evaluation Methods a. Developability

The photosensitive resin composition was coated on a glass substrate (100 mm×100 mm) by spin-coating method, and then a drying process under reduced pressure was performed for 30 seconds under 100 mmHg, so as to form a coated film. The thickness of the coated film is 2.5 μm.

Next, 2 wt % of potassium hydroxide solution was dropped on the coated film, and the dissolving time t of the coated film was evaluated. The aforementioned time (t) was equal to the developing time, and an evaluation was made according to the following criterion:

⊚: t≤15 seconds
○: 15 seconds<t≤20 seconds
Δ: 20 seconds<t≤25 seconds
X: 25 seconds<t b. Hardness The aforementioned coating film formed by pre-baking was illuminated by a UV device (Exposure paratus Canom PLA-501F) in 300 mJ/cm$^2$, immersed in a developing solution for 2 minutes, washed by water, and then dried at 200° C. for 80 minutes, thereby forming the 2.0 μm thickness of a photosensitive resin composition layer on a glass substrate. The aforementioned photosensitive resin composition was evaluated by Pencil Scratch Hardness Tester (Mistubishi/P-247).

The aforementioned photosensitive resin composition was evaluated by 500 g of weighs and drawn with 1 cm of lines by the pencil at 0.8 mm/s of rate at 60°, 120°, 180°, 240°, 300°, and 360°. When two of six lines (including 2 lines) have cracks, it means unqualified.

⊚: ≥4H
○: 3H
Δ: 2H
X: <2H c. Sputtered Resistance

The aforementioned photosensitive resin composition was formed a pixel color layer, and a 2040 Å ITO thin film with 14.6 Ω/sq of membrane resistance was formed by sputtering at 220° C. on the pixel color layer, so as to obtain a color filter. Then, surfaces of the red, green and blue pixel color layer of the color filter were observed with 100 times optical microscope:

○: no cracks or scratches
Δ: few cracks and surface scratches
X: many cracks and surface scratches

TABLE 2

Components and Evaluation of Examples of the Photosensitive Resin Composition

| Components | | | Examples | | | | | | |
|---|---|---|---|---|---|---|---|---|---|
| | | | 1 | 2 | 3 | 4 | 5 | 6 | 7 |
| alkali-soluble resin (A) (parts by weight) | | A-1 | 100 | | | | | | 50 |
| | | A-2 | | 100 | | | | | 50 |
| | | A-3 | | | 100 | | | | |
| | | A-4 | | | | 100 | | | |
| | | A-5 | | | | | 100 | | |
| | | A-6 | | | | | | 100 | |
| compound containing an ethylenically unsaturated group (B) (parts by weight) | B-1 | B-1-1 | 10 | | | | 100 | | |
| | | B-1-2 | | 50 | | | | 150 | |
| | | B-1-3 | | | 80 | | 20 | | |
| | | B-1-4 | | | | 100 | | | |
| | B-2 | B-2-1 | 10 | | | 50 | | | 50 |
| | | B-2-2 | | 50 | | | 80 | | 50 |
| | | B-2-3 | | | 120 | | | | |
| photoinitiator (C) (parts by weight) | | C-1 | 2 | 10 | | 20 | 20 | | 50 |
| | | C-2 | 5 | 20 | 30 | 30 | 30 | 5 | 50 |
| | | C-3 | 3 | | | | | 25 | |
| | | C-4 | | | | 30 | 30 | 50 | |
| organic solvent (D) (parts by weight) | | D-1 | 500 | | 3500 | 4000 | 2000 | 5000 | |
| | | D-2 | | 1500 | | | 1000 | | 4500 |
| pigment (E) (parts by weight) | | E-1 | 20 | | | | 40 | | |
| | | E-2 | | 60 | | | | 140 | |
| | | E-3 | | | 100 | | | | 120 |
| | | E-4 | | | | 200 | | | |
| compound (F) represented by Formula (I) (parts by weight) | | F-1 | 20 | | | | | | |
| | | F-2 | | 40 | | | | | |
| | | F-3 | | | 60 | | | | |
| | | F-4 | | | | | 80 | 50 | |
| | | F-5 | | | | | 50 | 150 | |
| | | F-6 | | | | | | | 200 |
| additive (G) | | G-1 | 0.1 | | | | | | 10 |
| | | G-2 | | | | | 5 | | |
| Evaluation | | Developability | ⊚ | ⊚ | ⊚ | ⊚ | ⊚ | ⊚ | ○ |
| | | Hardness | ⊚ | ⊚ | ⊚ | ⊚ | ⊚ | ⊚ | ⊚ |
| | | Sputtered resistance | ⊚ | ⊚ | ⊚ | ⊚ | ⊚ | ⊚ | ⊚ |

TABLE 3

Components and Evaluation of Comparative Examples of the Photosensitive Resin Composition

| Components | | | 1 | 2 | 3 | 4 |
|---|---|---|---|---|---|---|
| alkali-soluble resin (A) (parts by weight) | A-1 | | 100 | | | |
| | A-2 | | | 100 | | |
| | A-3 | | | | 100 | |
| | A-4 | | | | | 100 |
| | A-5 | | | | | |
| | A-6 | | | | | |
| compound containing an ethylenically unsaturated group (B) (parts by weight) | B-1 | B-1-1 | 50 | | | |
| | | B-1-2 | | 100 | | |
| | | B-1-3 | | | 150 | |
| | | B-1-4 | | | | |
| | B-2 | B-2-1 | | | | 200 |
| | | B-2-2 | | | | |
| | | B-2-3 | | | | |
| photoinitiator (C) (parts by weight) | C-1 | | 20 | | 5 | 50 |
| | C-2 | | 20 | 5 | 25 | 50 |
| | C-3 | | | 25 | 50 | |
| | C-4 | | | 30 | | |
| organic solvent (D) (parts by weight) | D-1 | | 1500 | | 2500 | |
| | D-2 | | | 2000 | | 3000 |
| pigment (E) (parts by weight) | E-1 | | 60 | | | |
| | E-2 | | | 80 | | |
| | E-3 | | | | 100 | |
| | E-4 | | | | | 150 |
| compound (F) represented by Formula (I) (parts by weight) | F-1 | | | | | |
| | F-2 | | | | | |
| | F-3 | | | | | |
| | F-4 | | | | | |
| | F-5 | | | | | |
| | F-6 | | | | | |
| additive (G) | G-1 | | | | | |
| | G-2 | | | | | |
| Evaluation | Developability | | Δ | Δ | Δ | X |
| | Hardness | | X | X | X | X |
| | Sputtered resistance | | X | X | X | X |

In Tables 2 and 3:

B-1-1 DPCA-120 (manufactured by Nippon Kayaku Co., Ltd), caprolactone-modified dipentaerythritol hexaacrylate B-1-2 DPCA-60 (manufactured by Nippon Kayaku Co., Ltd), caprolactone-modified dipentaerythritol hexaacrylate B-1-3 DPCA-30 (manufactured by Nippon Kayaku Co., Ltd), caprolactone-modified dipentaerythritol hexaacrylate B-1-4 DPCA-20 (manufactured by Nippon Kayaku Co., Ltd), caprolactone-modified dipentaerythritol hexaacrylate B-2-1 DPHA, dipentaerythritol hexaacrylate B-2-2 TO-1382 (manufactured by Toagosei Co., Ltd), dipentaerythritol pentaacrylate B-2-3 DPEA-12 (manufactured by Nippon Kayaku Co., Ltd), EO-modified dipentaerythritol hexaacrylate C-1 2-methyl-1-(4-methylthio phenyl)-2-morpholino-1-propanone C-2 2,2'-bis(2,4-dichlorophenyl)-4,4',5,5'-tetraphenyl-biimidazole C-3 4,4'-bis(diethylamino)benzophenone C-4 1-[4-(phenylthio)phenyl]-octane-1,2-dione 2-(O-phenyl amide oxime)

D-1 propylene glycol monomethylether acetate

D-2 ethyl 3-ethoxypropionate

E-1 C.I. Pigment R254/C.I. Pigment Y139=80/20

E-2 C.I. Pigment G36/C.I. Pigment Y150=60/40

E-3 C.I. Pigment B15:6

E-4 C.I. Pigment BK7

F-1 N,N-diallyl-3-(propylamino)propanamide

F-2 N,N,N,N-tetraallylethanediamide

F-3 benzene-1,2,4-tricarboxylic acid-tris-N,N-diallylamide

F-4 2,2',2'',2'''-(ethane-1,2-diylbis(azanetriyl))tetrakis(N,N-diallylacetamide)

F-5 N,N-diallylhexanamide

F-6 N,N-diallyl-2-(butyl-diallylcarbamoylmethylamino)acetamide

G-1 2,2-thiobis(4-methyl-6-t-butylphenol)

G-2 2-(3-t-butyl-5-methyl-2-hydroxyphenyl)-5-chlorobenzotriazole,

While embodiments of the present invention have been illustrated and described, various modifications and improvements can be made by persons skilled in the art. It is intended that the present invention is not limited to the particular forms as illustrated, and that all modifications not departing from the spirit and scope of the present invention are within the scope as defined in the following claims.

What is claimed is:

1. A photosensitive resin composition for a color filter comprising:
   an alkali-soluble resin (A);
   a compound containing an ethylenically unsaturated group (B);
   a photoinitiator (C);
   an organic solvent (D);
   a pigment (E); and
   a compound (F) represented by Formula (I);

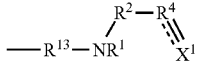

Formula (I)

wherein:

$R^1$ is selected from the group consisting of hydrogen, halogen, a nitro group, a hydrocarbyl group and

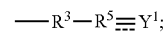

$R^2$ and $R^3$ are independently selected from the group consisting of $(CR^7R^8)_n$, $CR^9R^{10}$, $CR^7R^8CR^9R^{10}$ and $CR^9R^{10}CR^7R^8$;

n is 0, 1 or 2;

$R^7$ and $R^8$ are independently selected from the group consisting of hydrogen, halogen and a hydrocarbyl group;

either one of $R^9$ or $R^{10}$ is hydrogen and the other is an electron withdrawing group, or $R^9$ and $R^{10}$ together form an electron withdrawing group;

$R^4$ and $R^5$ are independently selected from the group consisting CH and $CR^{11}$;

$R^{11}$ is an electron withdrawing group;

the dotted line indicates the presence or absence of a bond;

$X^1$ is a $CX^2X^3$ group where the dotted line bond to which it is attached is absent;

$X^1$ is a $CX^2$ group where the dotted line bond to which it is attached is present;

$Y^1$ is a $CY^2Y^3$ group where the dotted line bond to which it is attached is absent;

$Y^1$ is a $CY^2$ group where the dotted line bond to which it is attached is present;

$X^2$, $X^3$, $Y^2$ and $Y^3$ are independently selected from the group consisting hydrogen, fluorine, a hydrocarbyl group, an alkyl group, an aryl group and a heterocyclic group; and $R^{13}$ is $C(O)$ or $S(O)_2$;

and wherein based on 100 parts by weight of a usage amount of the alkali-soluble resin (A), a usage amount of the compound (F) represented by Formula (I) is from 20 parts by weight to 200 parts by weight.

2. The photosensitive resin composition according to claim 1, wherein $R^1$ is a hydrocarbyl group substituted or interposed with a functional group.

3. The photosensitive resin composition according to claim 1, wherein based on 100 parts by weight of a usage amount of the alkali-soluble resin (A), a usage amount of the compound containing the ethylenically unsaturated group (B) is from 20 parts by weight to 200 parts by weight; a usage amount of the photoinitiator (C) is from 10 parts by weight to 100 parts by weight; a usage amount of the organic solvent (D) is from 500 parts by weight to 5000 parts by weight; a usage amount of the pigment (E) is from 20 parts by weight to 200 parts by weight.

4. The photosensitive resin composition according to claim 1, wherein the compound containing the ethylenically unsaturated group (B) comprises a compound (B-1) obtained by reacting a caprolactone-modified polyol with a (meth) acrylic acid.

5. The photosensitive resin composition according to claim 4, wherein the structure of the compound (B-1) obtained by reacting the caprolactone-modified polyol with the (meth)acrylic acid is represented by Formula (II):

6. The photosensitive resin composition according to claim 4, wherein based on 100 parts by weight of a usage amount of the alkali-soluble resin (A), a usage amount of the compound (B-1) obtained by reacting the caprolactone-modified polyol with the (meth)acrylic acid represented by Formula (II) is from 10 parts by weight to 150 parts by weight.

7. A method for manufacturing a color filter comprising forming a pixel layer with the photosensitive resin composition according to claim 1.

8. The method according to claim 7, wherein $R^1$ is a hydrocarbyl group substituted or interposed with a functional group.

9. The method according to claim 7, wherein based on 100 parts by weight of a usage amount of the alkali-soluble resin (A), a usage amount of the compound containing the ethylenically unsaturated group (B) is from 20 parts by weight to 200 parts by weight; a usage amount of the photoinitiator (C) is from 10 parts by weight to 100 parts by weight; a usage amount of the organic solvent (D) is from 500 parts by weight to 5000 parts by weight; a usage amount of the pigment (E) is from 20 parts by weight to 200 parts by weight.

10. The method according to claim 7, wherein the compound containing the ethylenically unsaturated group (B)

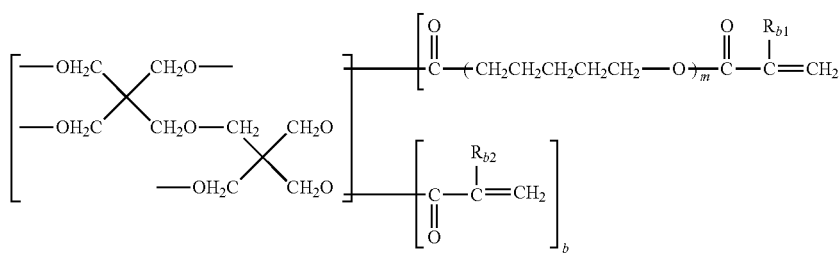

Formula (II)

wherein:

$R_{b1}$ and $R_{b2}$ independently represent hydrogen or a methyl group;

m represents an integer from 1 to 2;

a+b=2 to 6, and a represents an integer from 1 to 6; b represents an integer from 0 to 5.

comprises a compound (B-1) obtained by reacting a caprolactone-modified polyol with a (meth)acrylic acid.

11. The method according to claim 10, wherein the structure of the compound (B-1) obtained by reacting the caprolactone-modified polyol with the (meth)acrylic acid is represented by Formula (II):

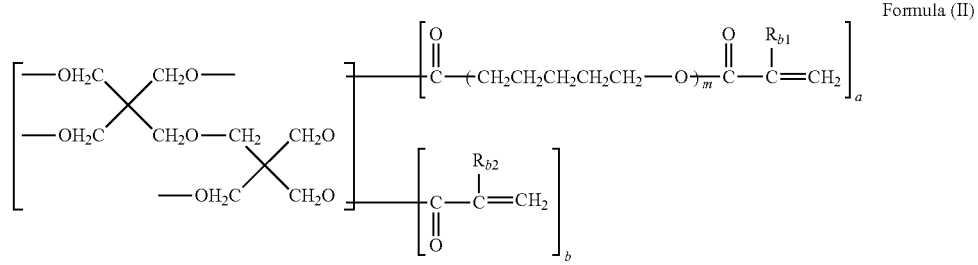

Formula (II)

wherein:

$R_{b1}$ and $R_{b2}$ independently represent hydrogen or a methyl group;

m represents an integer from 1 to 2;

a+b=2 to 6, and a represents an integer from 1 to 6; b represents an integer from 0 to 5.

12. The method according to claim 10, wherein based on 100 parts by weight of a usage amount of the alkali-soluble resin (A), a usage amount of the compound (B-1) obtained by reacting the caprolactone-modified polyol with the (meth)acrylic acid represented by Formula (II) is from 10 parts by weight to 150 parts by weight.

13. A color filter manufactured by the method according to claim 7.

14. The color filter according to claim 13, wherein $R^1$ is a hydrocarbyl group substituted or interposed with a functional group.

15. The color filter according to claim 13, wherein based on 100 parts by weight of a usage amount of the alkali-soluble resin (A), a usage amount of the compound containing the ethylenically unsaturated group (B) is from 20 parts by weight to 200 parts by weight; a usage amount of the photoinitiator (C) is from 10 parts by weight to 100 parts by weight; a usage amount of the organic solvent (D) is from 500 parts by weight to 5000 parts by weight; a usage amount of the pigment (E) is from 20 parts by weight to 200 parts by weight.

16. The color filter according to claim 13, wherein the compound containing the ethylenically unsaturated group (B) comprises a compound (B-1) obtained by reacting a caprolactone-modified polyol with a (meth)acrylic acid.

17. The color filter according to claim 16, wherein the structure of the compound (B-1) obtained by reacting the caprolactone-modified polyol with the (meth)acrylic acid is represented by Formula (II):

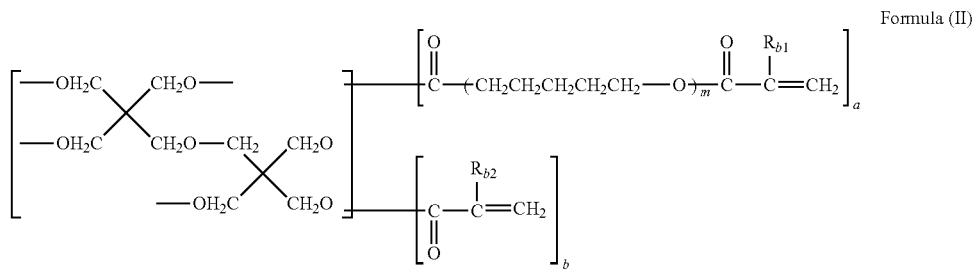

Formula (II)

wherein:

$R_{b1}$ and $R_{b2}$ independently represent hydrogen or a methyl group;

m represents an integer from 1 to 2;

a+b=2 to 6, and a represents an integer from 1 to 6; b represents an integer from 0 to 5.

18. The color filter according to claim 16, wherein based on 100 parts by weight of a usage amount of the alkali-soluble resin (A), a usage amount of the compound (B-1) obtained by reacting the caprolactone-modified polyol with the (meth)acrylic acid represented by Formula (II) is from 10 parts by weight to 150 parts by weight.

19. A liquid crystal display device comprising the color filter according to claim 13.

* * * * *